(12) United States Patent
Gorinevsky

(10) Patent No.: US 8,959,065 B2
(45) Date of Patent: Feb. 17, 2015

(54) SYSTEM AND METHOD FOR MONITORING DISTRIBUTED ASSET DATA

(75) Inventor: Dimitry Gorinevsky, Palo Alto, CA (US)

(73) Assignee: Mitek Analytics, LLC, Palo Alto, CA (US)

( * ) Notice: Subject to any disclaimer, the term of this patent is extended or adjusted under 35 U.S.C. 154(b) by 91 days.

(21) Appl. No.: 13/442,817

(22) Filed: Apr. 9, 2012

(65) Prior Publication Data

US 2013/0268501 A1    Oct. 10, 2013

(51) Int. Cl.
*G06F 7/00* (2006.01)

(52) U.S. Cl.
USPC ............. 707/693; 707/E17.002; 707/E17.032

(58) Field of Classification Search
CPC ............ G06F 11/34; G06F 17/30; G06F 7/00
USPC ........................................................ 707/693
See application file for complete search history.

(56) References Cited

U.S. PATENT DOCUMENTS

| | | | |
|---|---|---|---|
| 5,105,372 A * | 4/1992 | Provost et al. ............... | 702/185 |
| 5,602,749 A | 2/1997 | Vosburgh | |
| 5,737,215 A | 4/1998 | Schricker et al. | |
| 6,609,051 B2 | 8/2003 | Fiechter et al. | |
| 6,789,052 B1 | 9/2004 | Toprac | |
| 7,548,802 B2 | 6/2009 | Avery et al. | |
| 7,715,961 B1 | 5/2010 | Kargupta | |
| 7,761,201 B2 | 7/2010 | Avery et al. | |
| 7,783,507 B2 | 8/2010 | Schick et al. | |
| 7,983,809 B2 | 7/2011 | Kell et al. | |
| 7,984,146 B2 | 7/2011 | Rozak et al. | |
| 2008/0069334 A1 | 3/2008 | Denby et al. | |
| 2008/0103751 A1 * | 5/2008 | Hsiung et al. ................... | 703/20 |
| 2008/0133194 A1 * | 6/2008 | Klumpen et al. ............... | 703/10 |
| 2009/0327366 A1 * | 12/2009 | Alexander et al. ............ | 707/204 |
| 2010/0121609 A1 * | 5/2010 | Gorinevsky ................... | 702/183 |
| 2011/0248083 A1 * | 10/2011 | Bonner et al. ................. | 235/375 |

OTHER PUBLICATIONS

E. Chu, D. Gorinevsky, and S. Boyd, "Scalable statistical monitoring of fleet data," World IFAC Congress, Milano, Italy, Aug. 2011.*

(Continued)

*Primary Examiner* — Wei Zen
*Assistant Examiner* — Mohammed Huda
(74) *Attorney, Agent, or Firm* — TransPacific Law Group; Pavel I. Pogodin, Esq.

(57) ABSTRACT

A computer-based monitoring system and monitoring method implemented in computer software for detecting, estimating, and reporting the condition states, their changes, and anomalies for many assets. The assets are of same type, are operated over a period of time, and outfitted with data collection systems. The proposed monitoring method accounts for variability of working conditions for each asset by using regression model that characterizes asset performance. The assets are of the same type but not identical. The proposed monitoring method accounts for asset-to-asset variability; it also accounts for drifts and trends in the asset condition and data. The proposed monitoring system can perform distributed processing of massive amounts of historical data without discarding any useful information where moving all the asset data into one central computing system might be infeasible. The overall processing is includes distributed preprocessing data records from each asset to produce compressed data.

17 Claims, 9 Drawing Sheets

System Overview

(56) References Cited

OTHER PUBLICATIONS

N. H. McClamroch, *Steady Aircraft Flight and Performance*, Princeton University Press, pp. 28-39, 126-148, 2011.

"Distributed Data Mining for Aircraft Health Management," Mitek Analytics LLC, Technical report for NASA 2010-1 SBIR Phase I, NNX11CD04P, submitted to NASA on Sep. 20, 2011 (limited US government distribution protected by SBIR rights).

* cited by examiner

SYSTEM AND METHOD FOR MONITORING DISTRIBUTED ASSET DATA

STATEMENT OF GOVERNMENT INTEREST

This invention was made with government support under contract No. NNX11CD04P awarded by NASA. The government has certain rights in the invention.

GOVERNMENT RIGHTS

This invention was made with Government support under contract number NNX11CD04P awarded by NASA. The Government has certain rights in this invention.

BACKGROUND OF THE INVENTION

1. Field of the Invention

This invention is generally related to monitoring systems, where data from an asset is collected and processed by a computing system.

2. Description of the Related Art

The monitoring and reporting of the anomalies could serve one or more purposes including quality assurance for manufacturing processes, improvement of operations safety (early warning of incipient problem), condition-based maintenance (CBM) of the assets, and performance monitoring. Examples of the performance monitoring are monitoring fuel consumption of a power generation system or of an aircraft with the purpose of adjusting the hardware or operational regime in case of anomaly.

The word "asset" as used herein may include a machine, an industrial plant, a vehicle, a manufacturing process, a building, a facility, a utility system, a computer network, or other engineered system. "Monitoring" here is defined as determining whether an asset is operating normally and, if not, determining more detailed information about the anomaly experienced by the asset. "Monitoring system" here includes asset data management, monitoring methods, computational logic implementing the monitoring methods, software services supplementing the computational logic, systems architecture, and an arrangement for reporting the monitoring results.

The simplest form of monitoring, known as Statistical Process Control (SPC), has been extensively used for several decades. SPC has been introduced for quality assurance when the monitored asset is a manufacturing process. The original SPC methods are univariate: a time series for a selected measured or computed parameter is compared against control limits; the exceedances of the control limits are reported as anomalies.

An extension of the SPC is Multivariate Statistical Process Control (MSPC). The MSPC monitors many data channels simultaneously and can provides significant improvement over univariate SPC monitoring of individual channels if the monitored channels are strongly correlated, as often is the case in practice. In general, MSPC requires computer processing of streaming multivariable data. The MSPC found broader use in the last two decades with proliferation of digital computers, especially for monitoring of industrial plants and processes.

SUMMARY OF THE INVENTION

The inventive methodology is directed to methods and systems that substantially obviate one or more of the above and other problems associated with conventional techniques for monitoring distributed asset data.

In accordance with one aspect of the invention, there is provided a system and method for monitoring a fleet of the assets of the same type using distributed computing. In the preferred embodiment, the assets are aircraft of the same type and the asset data are flight performance data collected during the flight with a flight recorder and then transferred into a Local Data Repository in a ground computer system. There can be multiple Local Data Repositories. The fleet data has large scale: there is much more data than possible for in-memory computer processing. Because of that, the bulk of the collected historical data is stored in external memory (disk storage, magnetic tape, flash memory, or other) attached to a computer system.

Various embodiments of the inventive concept allow several separate Local Data Repositories, each storing data from a part of the fleet. The fleet data could be partitioned into several repositories because the overall fleet consists of several fleets belonging to several different operators, each collecting and storing the data in a separate repository. In another preferred embodiment, the assets are machines in manufacturing plants and the data repositories are historian databases that local to each plant; there are several plants that are geographically distributed. In yet other preferred embodiment, the assets are power generating turbines installed at several locations each with its own historical data recorder that serves as the Local Data Repository. The Local Data Repositories could be geographically remote; in that case it is difficult to aggregate the collected data because it takes a lot of time to move several Terabytes (Tb) of data over long distance Internet connection. Another reason why the data in different repositories might be kept local and separate is data privacy concern. The asset fleets and their local data repositories might belong to different owners even if all the assets might be produced by the same manufacturer.

In one or more embodiments, each Local Data Repository is connected to a Local Computing Element (CE). Each CE might include one or several tightly coupled processors with shared data storage. In one embodiment, a single processor, a laptop computer, a desktop computer, a multi-processor workstation computer, a server, a mainframe, or a computer cluster might be used as a CE. The Local CE is used for processing the data in the Local Data Repository. One possible reason for distributing the data is that the entire data set is very large and has to be split between multiple storage locations. Other possible reason is the data privacy mentioned above. To aggregate all available information and get the full benefit from access to it, all Local Data Repositories are collected to a Central Computing Element through a data link. In the preferred embodiment, the data link is a computer network connection. The Central CE might be collocated with one of the Local CEs and might be implemented through software as a separate computational process sharing the computer hardware with one of the Local CE's. The data links connecting the Local CEs and the central CE could be remote network links that are relatively slow and do not allow for massive amounts of data to be transferred quickly. Embodiments of this invention described computational processing of the data that includes data preprocessing performed locally, where the bulk of the data is stored. The preprocessing result, which is much smaller than the original 'raw' data, can be then transferred over the network to the Central CE for the coordination. A distributed computing arrangement with multiple distributed CEs and relatively slow network links connecting the CEs falls into the computing paradigm known as 'Grid Computing'.

In one or more embodiments, the data from asset fleet are collected and processed as a series of data records (data segments). Each data record contains a series of data samples from an asset; each data sample contains data from multiple data channels collected at coordinated time. When monitoring the fleet data there is need to take into account record-to-record (segment-to-segment) and asset-to-asset variability inherently present in the data. Such variability is known as 'fixed effects' in statistics. The record-to-record variability might be caused by accumulation of deterioration in the asset. The asset-to-asset variability is caused by all assets being slightly different, even though they are of the same type. Various embodiments of the invention allow monitoring of large scale data taking into account the fixed effects.

In one or more embodiments, to distinguish between the record-to-record variability, the asset-to-asset variability, and sample-to-sample noise inside each record, it is necessary to look at the entire data set data holistically. In other words, coordinated processing of all the available data from all assets is desired. This coordinated data processing might be performed in a batch mode by processing the entire data set together. Alternatively, the coordinated data processing can be performed incrementally, by adding new data chunks and updating the intermediate processing state data to reflect all data processed so far. In the incremental data processing, the processing results are computed based on the intermediate processing state data.

In one or more embodiments, to process the distributed data from the assets, each of the Local CE's preprocesses the data in the Local Data Repository and produces compressed data. The compressed data from each Local CE, which has substantially reduced size compared to the full data, is transmitted over the data link to the Central Computing Element. By aggregating and post-processing the compressed data, the Central CE solves optimal estimation and detection problems for monitoring of the entire asset fleet taking into account the fixed effects. The described staged distributed processing of the asset data is performed such that the results are exactly the same optimal solution that would be obtained if it were possible to collect and aggregate all the data at a single location. The preferred embodiment of the compression approach and the centralized post-processing logic are presented in the detailed description of various embodiments of the invention below.

In one or more embodiments, the output of the overall monitoring system is Monitoring Reports that are produced by the Central CE based on the computed solutions of the estimation and detection problems. The monitoring reports could include the results of anomaly detection and/or fault isolation (a.k.a. diagnostics), and/or forecasting (a.k.a. prognostics) for the asset fleet. These reports could be displayed by the Central CE or transmitted to other computer interconnected systems.

In one or more embodiments of the fleet-wide monitoring system, the computational logic is implemented using a 'pipeline' processing architecture. The computations are implemented as a series of 'datapipes' connected through data buffers. Each datapipe is implemented using a computational agent that reads data from an input buffer and writes the results to an output buffer. The buffer is an area of computer temporary or long term storage memory shared by the agents. For the distributed computations, the data is transferred between the buffers at different CEs using one of the existing distributing computing technologies.

Since the fleet data sets are large, in one or more embodiments, the buffer size can be large—much bigger that the available operating memory. Therefore, each agent reads and processes data in smaller chunks. The entire buffer can be processed by sequentially iterating the chunk data processing by the agent. Alternatively, it can be processed by running multiple copies of the agent on multiple processors in a CE to process several data chunks in parallel. The data processing could be performed completely in parallel in what is known as embarrassingly parallel computing; for example, the input data chunk pertains to one asset and the output data chunk pertains to the same asset. Alternatively, the datapipe might include gather action where the data for each asset are combined to produce shared fleet-level data. Conversely, a datapipe might include a scatter action where fleet-level data enter into asset-specific processing. The sequence of the data processing operations for the preferred embodiment is described below.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

Figure 1:
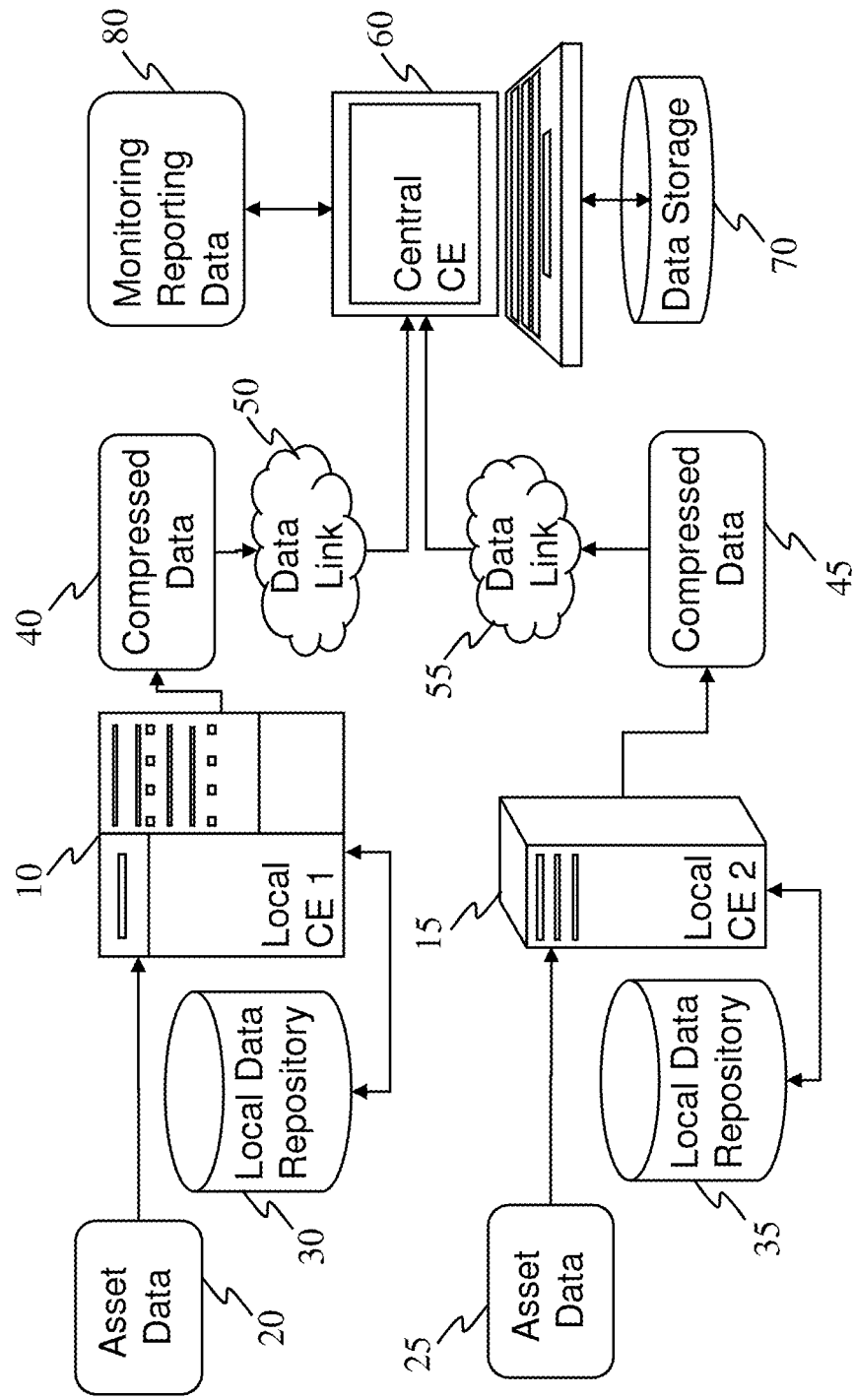
FIG. 1 is a block diagram which illustrates composition of a representative fleet monitoring system implementing the method in accordance with an embodiment of inventive concept.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of software running on a general purpose computer, in the form of a specialized hardware, or combination of software and hardware.

One or more embodiments of the invention address the need to monitor a plurality of assets of the same type—a fleet of the assets. The examples are aircraft fleet, ground vehicle fleet, power turbine fleet, and other. The fleet monitoring is characterized by an exceedingly large scale of the data and non-stationary nature of the data. The data from the assets in the fleet is collected as data records. Each data record consists of one or more coordinated samples of the asset data channels. The modern practices are to store collected historical data in a computer system. The asset monitoring requires computer processing of the data stored in the large historical data sets.

The important problem features that need to be addressed by a fleet monitoring system include:

1. Variability of the operating conditions for each asset. This issue is recognized and addressed in some of the prior art cited below.

2. Variability of the assets. The assets are of the same type but not identical (there are fixed effects). There is also a need to take into account drifts and trend (longitudinal study). Very little prior art addresses this.

3. Huge amounts of historical data. Discarding the collected data is unreasonable because it might contain useful information. The data storage is become cheaper all the time and it is usually practical to keep all the historical data. At the same time, moving all the collected data into one central computing system to be processed there might be infeasible because of the network bandwidth limitations. This calls for distributed preprocessing of the collected data that is coordinated with a subsequent centralized post-processing. Distributed preprocessing and subsequent centralized post-processing is described in some prior art, but the information contained in the collected data is lost in such processing One or more embodiments of inventive concept allow keeping the raw data with all their information were it is collected. The combination of the distributed preprocessing and centralized post-processing of the preprocessed data described in this invention yields the same result as would be obtained if all data were gathered and processed in one location. The described processing takes into account the variability of the operating conditions for each asset and the variability of the assets.

Some aspects of the abovementioned important problem features are addressed in the prior art. For example, the data compression for monitoring is discussed in U.S. Pat. No. 5,602,749, incorporated herein by reference. The idea is to perform preprocessing to detect anomalies and send anomaly data only for post-processing. This allows compressing the data greatly, but most of the raw data and information in the data is lost. In U.S. Pat. No. 6,789,052 by AMD, incorporated herein by reference, the data compression uses control model for data reduction. Both U.S. Pat. No. 5,602,749 and U.S. Pat. No. 6,789,052 teach processing for a single asset and make no claims about fleet data monitoring.

The variability of the assets in the fleet is considered in several prior patents. U.S. Pat. No. 5,737,215 by Caterpillar, incorporated herein by reference, teaches centralized processing of data from all assets in the fleet; some of the computed parameters are locally compared to the population mean. U.S. Pat. No. 6,609,051 by DaimlerChrysler teaches centralized processing of data for a vehicle fleet. All data is transferred to a central computer rather that being accumulated at each vehicle. The variability of the assets is recognized by correcting the individual vehicle models based on the centralized processing results. U.S. Pat. No. 7,548,802 by Boeing, incorporated herein by reference, addresses monitoring for a fleet of aircraft with all data transferred into an operations center. U.S. Pat. No. 7,761,201 by GE, incorporated herein by reference, teaches centralized monitoring, where a small amount of data is collected from each turbine engine in a fleet. U.S. Pat. No. 7,783,507 by GE, incorporated herein by reference, teaches centralized monitoring for a plurality of assets, such as locomotives. U.S. Pat. Nos. 7,983,809 and 7,984,146 by Sikorsky, incorporated herein by reference, teach centralized monitoring for a fleet of aircraft, where data collected during the flight are downloaded from the aircraft into a ground system.

There is limited prior art describing fleet monitoring with distributed processing of the data. U.S. Pat. No. 7,715,961, incorporated herein by reference, teaches distributed data mining at each vehicle that extracts data patterns for centralized processing; each vehicle has a small database and the raw data is discarded after it is processed. US Pat App 2008/0069334, incorporated herein by reference, teaches distributed data processing with a plurality of distributed agents; each agent detects limit exceedances and only exceedances are communicated to the central server, the raw data is discarded.

The processing of fleet data taking into account asset-to-asset variation in the fleet data is considered in the paper by E. Chu, D. Gorinevsky, and S. Boyd, "Scalable statistical monitoring of fleet data," *World IFAC Congress*, Milano, Italy, August 2011, incorporated herein by reference. This prior paper describes a 2-level regression model and the optimization-based monitoring concept related to the described invention. The paper assumes that a limited amount of the data is collected for each asset, a single data vector. The aforesaid paper describes an algorithm that is related to the centralized data post-processing in the preferred embodiment of this invention and allows taking into account the variability of the operating conditions for each asset and the variability of the assets. The paper does not describe the computational architecture or implementation of the distributed monitoring system. In particular, the paper does not describe the distributed preprocessing of the data performed in combination with the centralized post-processing.

Various embodiments of the inventive concept relate to a method for monitoring of a fleet of assets; the method can be implemented as a part of dedicated monitoring system or as a software program product. The proposed monitoring method is preferably implemented in software and can be adapted to work with different types of applications (asset types, monitored data, monitored behaviors, and systems) by changing data processing steps of the method, models used in the method, computing system configuration, and other configurable parts of the method. The embodiments described below describe examples of the assets for which this method can be implemented; the method is not limited to these example assets.

FIG. 1 illustrates an embodiment with Local Computing Element (CE) 10 and Local CE 15 receiving Asset Data 20 and 25 and storing these data locally in Data Repositories 30 and 35 as data records. Each of the Local CEs 10 or 15 takes the data records in the respective Local Data Repository 30 or 35 and preprocesses these data records to produce Compressed Data 40 or 45. The Local CEs 10 or 15 is connected to a Central CE 60 through Data Links 50 and 55 respectively. The Compressed Data 40, 45 is transmitted over the Data Links 50, 55 to the Central CE 60 where it is collected and stored in Data Storage 70 for processing. The Central CE 70 post-processes the Compressed Data from all Local CEs and produces Monitoring Reporting Data. The Monitoring Reporting Data is displayed or transmitted by the Central Computing Element as the monitoring system output. First, the post-processing computes the fleet model from the preprocessed data. Second, the fleet model is used to produce anomaly reports and other parts of Monitoring Reporting Data.

The figure shows two Local CEs; in fact, this invention is not limited to the number of Local CEs shown, there should be at least one Local CE, and there could be many CEs. The Local Data Repositories could include but are not limited to disk drives, tape storage, flash drives, integrated database management systems, optical disks, and other. The assets that provide data 20 and 25 can be any engineering systems, aircraft, propulsion systems, power generating equipment, power transmission and distribution equipment, engines, vehicles, machines, devices, electrical power systems, semiconductor manufacturing tools, HVAC equipment, computer networks, electronic equipments, laboratory equipment, computer systems, navigation systems, communication equipment, cell phones, etc. The proposed invention is applicable to different types of assets including but not limited to the systems described in detail below. Each of the Local and Central CEs could be single processors, PC desktop or laptop computer, computer workstation, multiprocessor server computer, mainframe computer, or a computer cluster. The communication between processors in each CE is relatively fast. The data links between CEs are preferably network connections, but can be also dedicated communication links. The claimed invention allows relatively slow data links between the Central and Local CEs, but fast links are also in the invention scope. One alternative embodiment of the computational architecture includes Central CE collocated with one of the distributed CE's and possibly sharing resources with this distributed CE.

In one or more embodiments, it is important that the compressed data obtained as the preprocessing output is relatively small in size, while the asset data can be large in size. This makes it possible to transfer the compressed data over the data links to the central CE for post-processing. Very large asset data sets can be processed in parallel by the distributed local CEs. The initial asset fleet data consists of individual data records, the preprocessing of each data record is independent of preprocessing of other data records. Preprocessing one data record at a time can be parallelized between multiple processors in one CE in addition to being distributed between different CE's. In parallel processing performed in one CE, the copies of the preprocessing logic (computational agents) running at different processors of one CE have access to the same data set. In the distributed preprocessing, different asset data sets are stored in local data repositories of the CEs.

In one or more embodiments, many steps of the described post-processing of the compressed data in the central CE can be parallelized as well, for example by doing the processing for data pertaining to one asset in parallel for each asset.

In one or more embodiments, the computed anomaly results could be used to generate human readable reports from the anomalies detected as a result of the monitoring. The reporting of the anomalies can be made more detailed by pulling original asset data records from the distributed CE's. Since there are a small number of anomalies, only a small number of the asset data records need to be transferred to the central CE for the reporting. In the preferred embodiment of the aircraft fleet performance monitoring, the anomalies that are monitored and reported include anomalies for asset model (M-type anomalies), for the record-to-record trend for a given asset (T-type anomalies), and for individual data records (I-type anomalies).

Figure 2:
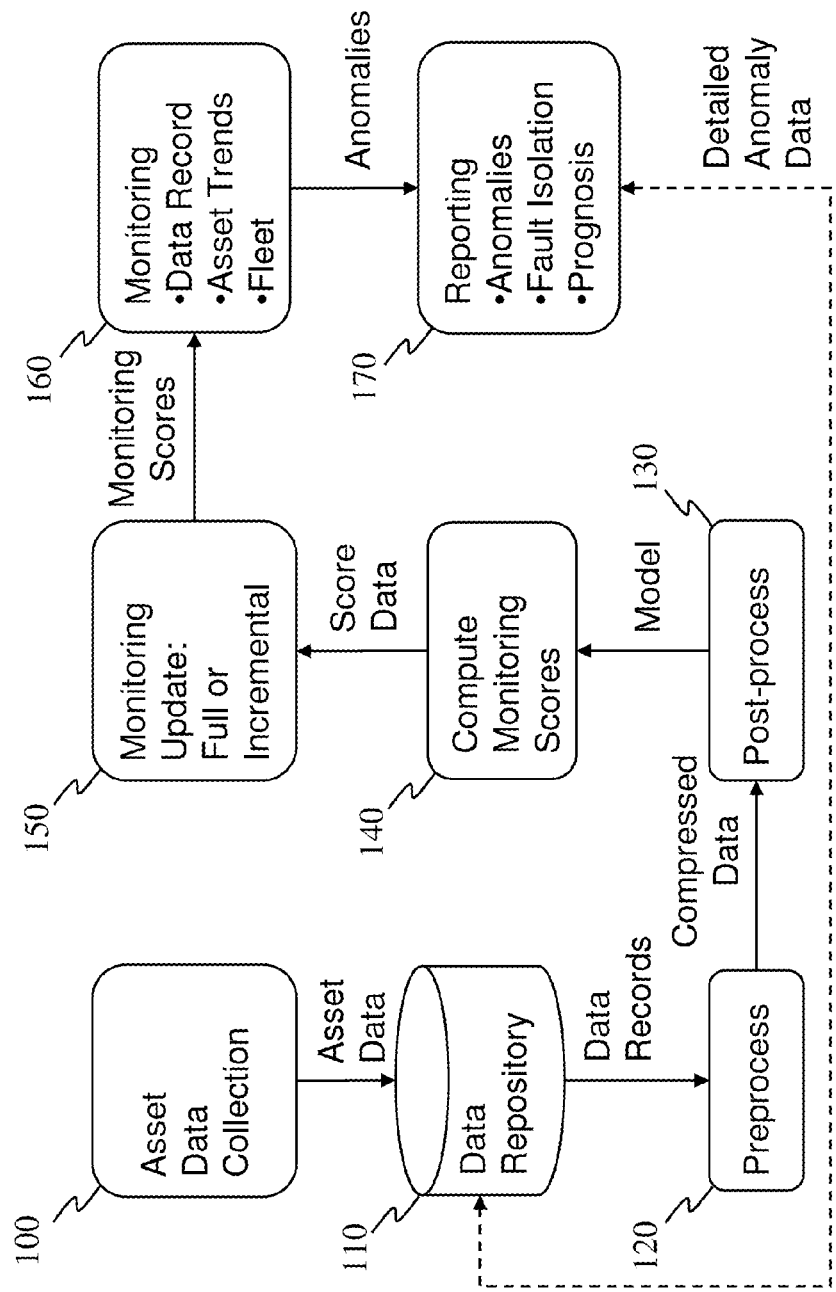
FIG. 2 is a block diagram which depicts overall functionality and component parts (steps) of the system and method in accordance with an embodiment of inventive concept.

FIG. 2 illustrates a functional decomposition of the preferred embodiment and shows the functions that process and generate the data illustrated in FIG. 1. The functions are implemented using the computing elements illustrated in FIG. 1.

In one or more embodiments, the overall monitoring data function takes incremental data (Asset Data Records) or all fleet data (the data in Local Data Repositories) and reports monitoring results, such as anomalies. The claimed invention is an extension and generalization of known to Multivariate Statistical process Control (MSPC) systems; it allows coordinated processing of data from two or more assets distributed over two or more Local CEs. In the preferred embodiment, the asset data are FOQA (Flight Operation Quality Assurance) data collected from aircraft, its propulsion, and aircraft systems. The detailed description of functional components below is for the preferred embodiment of the FOQA data processing for aircraft fleet. The collection of these functions fits a 3-level regression to the fleet data and reports anomalous deviations from this model. The claimed invention is not limited to this embodiment and is applicable to other asset types and to other types of the models.

In FIG. 2, Asset Data are initially obtained from Asset Data Collection function 100 that interfaces with the assets and includes the collection logic. Asset Data that become available are added to Data Repository 110 in the form of Data Records, each integrating Asset Data collected over a certain interval of time.

In one or more embodiments, the preprocess function 120 produces Compressed Data providing a compact representation of the Data Record. The preprocessing handles one Data Record at a time. Each Data Record is preprocessed separately and independently. The preprocessing is distributed over multiple Local CEs. It can be parallelized (embarrassingly parallel) for Local CEs that have multiple processors.

In one or more embodiments, post-process function 130 is implemented in the Central CE and produces a 3-level regression model of the fleet data. The Compressed Data (preprocessing results) for all assets received from the Local CEs are combined (gathered) by function 130 to compute fleet-level model and asset-level models. The fleet-level model contains a small amount of data and can be easily transferred around. The asset-level computations can be performed in parallel (or done sequentially) and independently for each asset; the fleet-level model is used in the solution for each asset. If the asset-level solutions are distributed over many processors, then the fleet-level model is distributed (scattered) to all these processors.

In one or more embodiments, the Preprocess and Post-process steps might be repeated iteratively if necessary. The iterative update is unnecessary in the preferred embodiment for quadratic optimization, but might be necessary in other embodiments where the 3-level regression problem includes inequality constraints and/or non-quadratic non-linear terms.

In one or more embodiments, compute Monitoring Scores function 140 uses the 3-level regression model of the fleet data from post-process function 130 to produce Score Data. The 3-level regression Model includes the fleet-level model, individual models for each asset, and estimated trends for each asset. Score Data provide the input into monitoring decision algorithms and are computed from the Compressed Data at the output of the Preprocess function 120 and the 3-level regression Model. In the preferred embodiment, the Score Data include Hotelling T2 statistics computed for the 3-level regression Model fit residuals for each Data Record.

In one or more embodiments, monitoring Update function 150 takes the Score Data computed by function 140 and produces Monitoring Scores as the main input into the anomaly detection decisions. Monitoring Update 150 can be Full or Incremental. Full Monitoring Update uses all relevant historical data in Data Repository and replaces the Monitoring Scores with the new Score Data. Incremental Monitoring Update processes a new portion of the data only. Such incremental processing would use the existing model and other interim processing data accumulated and stored in the Central CE. In general, the Incremental Monitoring Update also includes update of the model based on the new portion of the data. By re-computing only what is necessary the incremental processing can be very efficient. Incremental data processing could use the same functions as the full data processing. It will process the new data and use the already processed data in the pipeline architecture buffers where possible. Note that the full processing can be done as a series of increments.

In one or more embodiments, monitoring function 160 takes the Monitoring Scores produced by function 150 and flags anomalies in the Asset Data to produce Anomalies Data. In general, this is done by comparing the monitoring scores with the alarm thresholds. The thresholds can be predetermined or computed. In the preferred embodiment the Monitoring Scores are Hotelling T2 or SPE (Squared Prediction Error) Q statistics, the anomaly decision is based on the Monitoring Scores being above the respective threshold and the thresholds are established from the false positive/false negative alarm tradeoff. In the preferred embodiment of aircraft fleet monitoring, three types of anomalies are detected: (i) Anomalous Data Record Instance, the I-type anomaly, (ii) Anomalous Asset Trend, the T-type anomaly, and (iii) Anomalous Asset Model, the M-type anomaly.

In one or more embodiments, reporting function 170 takes the Anomalies data by Monitoring function 160 and generates more detailed anomalies reports that have form accessible to human operators. The specific form of this representation is subjective and can vary broadly depending on the representation. For example the reporting can include summary conclusions for operators and maintenance personnel. Alternatively (or additionally) the report can include detailed engineering information in the forms of detailed graphs, charts, and tables for the engineering personnel.

In one or more embodiments, the anomalies report might include creating a formatted and integrated Anomalies Report based on the Anomalies Data. The anomalies report might include Fault Isolation information for the detected anomalies pointing at the possible root causes of the anomalies. The anomalies report might also include a Prognosis report that provides a forecast for the incipient, low level, anomalies developing into failures or faults in the assets. As a part of the detailed anomalies report preparation, Reporting function 170 implemented in the Central CE might request Detailed Anomaly Data from Local CE connected to the appropriate Local Data Repository 110. Such Detailed Anomaly Data could include the complete content of the Data Records that were found anomalous.

In one or more embodiments, in addition to what is shown in FIG. 2, the monitoring method can include additional interactive functions for reporting out the computation details, status of the CEs and data, configuration, administration, etc. These supporting functions can be implemented using any of the known technologies. Examples of the additional supporting functions include Graphical user interface (GUI) to initiate different actions and examine the intermediate and final results.

Methods for handling meta information, e.g., a database that keeps track of the processed data records, results, processing parameters, and processing conditions.

An exemplary implementation of the computational logic for this invention can be explained in the context of regression model fitted to the data collected from the assets. A starting point of the explanation to follow is a basic linear regression model for a single asset performance within a single data record that can be written in the form $$y(t)=Bx(t)+v(t),$$

where y is a vector of the performance (dependent) variables with components $y_1(t)$ and $y_2(t)$, x is a vector of regressors (explanatory variables), B is a matrix of regression parameters (the model), and v is a residual of the regression fit. The components of y and x are linear or nonlinear combinations of the asset data channels chosen in accordance with the known structure of the asset model. The regression model B comprises the regression model parameters. In the preferred embodiment of the aircraft fleet monitoring, an example regressor is dynamic pressure computed from aircraft air data system measurements, and the regression model B includes the aerodynamic coefficients. The described data-driven model can be used for MSPC monitoring of the residual $r(t)=y(t)-Bx(t)$. Covariance of the residual necessary for the MSPC monitoring can be estimated empirically.

Figure 3:
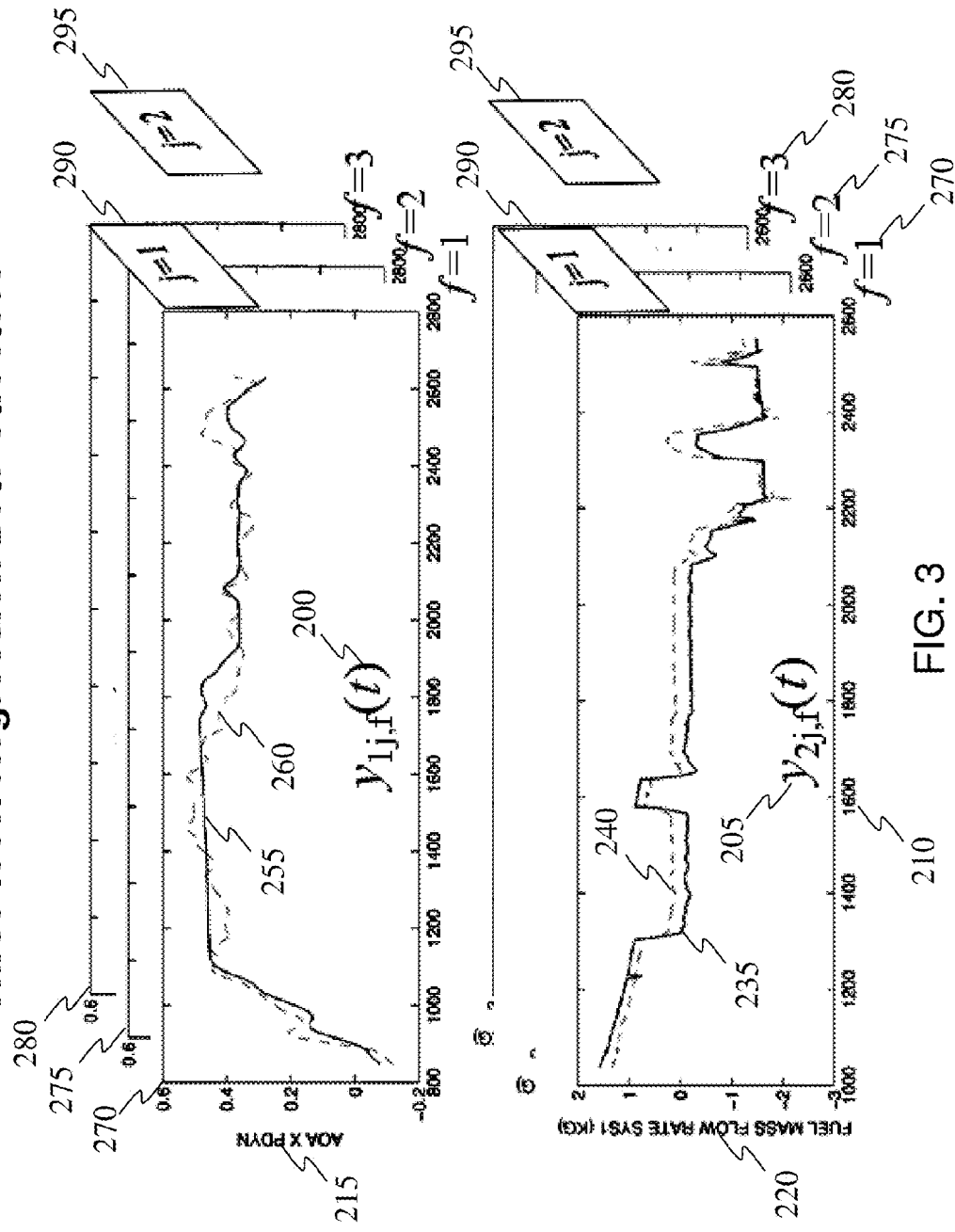
FIG. 3 is a block diagram which illustrates the 3-level regression data structure for an embodiment of this invention.

One or more embodiments of the inventive concept use a generalization of the simple regression model described above. FIG. 3 illustrates data set for the preferred embodiment of aircraft FOQA data monitoring. Variables $y_{1,jf}(t)$ 200 and $y_{2,jf}(t)$ 205 plotted in FIG. 3 corresponds to the dependent variables in the preferred embodiment of aircraft FOQA data monitoring. In FIG. 3, abscissa 210 in the plots is the FOQA data sample number t within the flight. The ordinate 215 in the upper plot corresponds to the dependent variable $y_{1,jf}$ 215 that is computed from the raw FOQA data as aircraft angle of attack (AOA) times dynamic pressure (PDYN). The ordinate 220 in the lower plot corresponds to the dependent variable $y_{2,jf}$ 220 FUEL MASS FLOW that is taken directly from raw FOQA data. The indexes 1 and 2 at the dependent variables y point at the vector components, the indexes j and f separated by comma from the first index point at the asset (aircraft tail) number j and data records number f (consecutive flight number) for this asset.

FIG. 3 illustrates that the fleet data can be thought of as three-level data. The occasions (data record numbers) f are at level 1. FIG. 3 shows the flight data, which is exemplified by the displayed plots, as plot planes 270 (for f=1), 275 (for f=2), and 280 (for f=3). The assets (aircraft tail numbers) j are at level 2, and sample number t within the data record at level 3. FIG. 3 shows the assets data, as plot slabs 290 (for j=1) and 295 (for j=3). Each slab is shown to include three planes corresponding to three data records with numbers f=1, 2, 3;

each plane includes the plotted functions $y_{1,jf}(t)$ 200 and $y_{2,jf}(t)$ 205 of the sample number t.

In one or more embodiments, for the 3-level data, the basic regression model is extended by adding fixed effects and nonparametric model for longitudinal data. Longitudinal data, often called repeated measurements in medicine and panel data in the social sciences, describe model change in consecutive data records (e.g., consecutive flights of the same aircraft). The following 3-level regression model with fixed effects and longitudinal data is used $$y_{jf}(t) = B_j x_{jf}(t) + a_{jf} + v_{jf}(t), \quad (1)$$

where $B_j$ is the matrix of regression parameters for asset number j, vectors $a_{jf}$ describe nonparametric fixed effects for the longitudinal data (asset-specific trends), and vectors $v_{jf}$ describe random effects in each occasion. In FIG. 3, the solid curves 235 and 255 illustrate the data $y_{jf}(t)$ and the dashed curves 240, 260 illustrate the regression fit.

Figure 4:
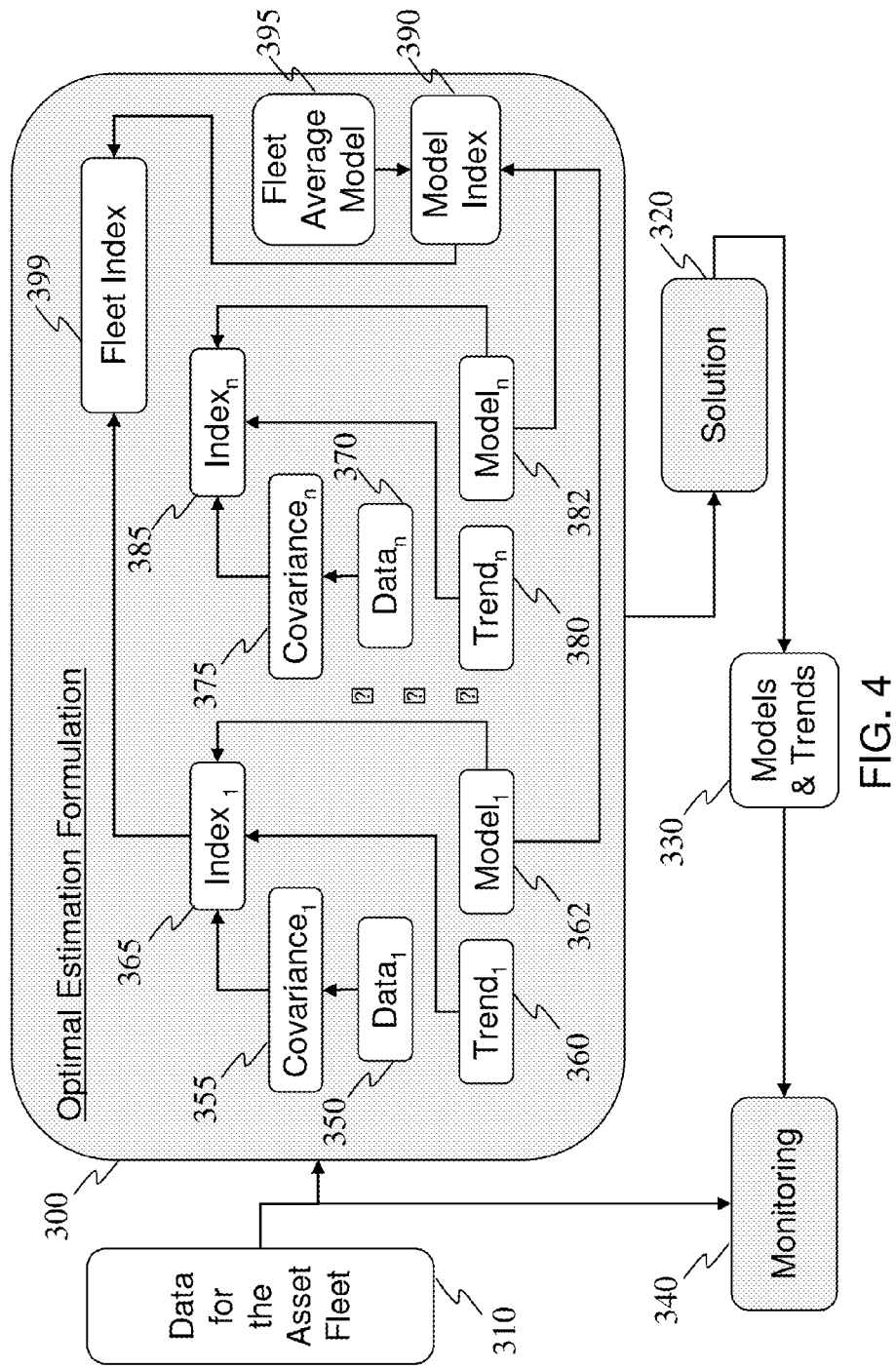
FIG. 4 is a block diagram which depicts overall functionality and component parts (steps) of the optimal estimation and monitoring methods in accordance with an embodiment of inventive concept.

FIG. 4 illustrates a preferred embodiment for the optimization-based fleet monitoring approach that is based on the 3-level regression model. A variety of regression fitting and monitoring approaches can be used in accordance with this invention. As an illustrative example, the regression fit can be expressed as minimization of the following Fleet Index $$L = \sum_j L_j + \mu \frac{1}{2} \sum_j \|B_j - B_*\|_F^2 \quad (2)$$

$$L_j = \sum_f M_{jf} + \rho \frac{1}{2} \sum_f \|a_{jf} - a_{j,f-1}\|^2 \quad (3)$$

$$M_{jf} = \frac{1}{2} \sum_f \|y_{jf}(t) - B_j x_{jf}(t) - a_{jf}\|^2 \quad (4)$$

In one or more embodiments, fleet Index L in (2) consists of three parts

1. Model fit error index for the fleet computed by summing up the individual model error indexes $M_{jf}$ in (4) over all data records for all assets in the fleet.

2. The quadratic penalty of the trend increment computed by summing up the individual trend increment penalties $//a_{jf} - a_{j,f-1}//^2$ in (3) over all data records for all assets in the fleet.

3. The quadratic model variation penalty computed by summing up the individual model variation penalties $//B_j - B*//^2$, where B* is an unknown average fleet model.

In one or more embodiments, loss index (2) includes all historical data available for all assets in the fleet through the observation period. This data is very large and distributed over data repositories Local CE's. The claimed invention makes it possible to compute the solution of optimal estimation problem (2) efficiently using the claimed distributed computing architecture consisting of Local CEs and the Central CE. The computed optimal solution is exactly the same as if all the data were available at one location and could fit into computer memory for solving (2).

In one or more embodiments, when evaluating or optimizing index (2), most of the computations involving the bulk of the Asset Data in (2) are related to indexes $M_{jf}$ in (4). These indexes can be represented as $$M_{jf} = [IB_j - a_{jf}] Q_{jf} [IB_j - a_{jf}]^T \quad (5)$$

where $Q_{jf}$ is the covariance matrix computed for the data record f obtained from asset j $$Q_{jf} = \sum_t q_{jf}(t) q_{jf}(t)^T, \quad (6)$$

$$q_{jf}(t) = \begin{bmatrix} y_{jf}(t) \\ x_{jf}(t) \\ z_{jf}(t) \end{bmatrix}$$

A constant bias $z_{jf}(t)=1$ is assumed inside each data record. Other bias shapes are also compatible with the formulation above. If data record is large, the covariance matrix $Q_{jf}$ is much smaller in the data size compared to all data in the data record. In the preferred embodiment of aircraft fleet monitoring, the data collected in one flight might contain a few dozen channels sampled at 10,000 instances—several Mb of data at all. For a couple dozen regressors, the covariance matrix $Q_{jf}$ would take a few Kb of memory—this constitutes data reduction in excess of 1000:1. The above reasoning defines the data pre-processing performed at each Local CE. The data for the fleet is preprocessed one data record at a time to provide a compact representation of the data in that data record in the form of the covariance matrix $Q_{jf}$.

In one or more embodiments, the minimization of index L (2) can be interpreted as optimal Bayesian estimation of the regression coefficients from the data. FIG. 4 illustrates the described optimization-based estimation formulation. Given the Asset Fleet Data 310, the optimization-based estimation formulation 300 defines the optimal solution 320. The Asset Fleet Data 310 is used to compute the dependent variables $y_{jf}(t)$ and explanatory variables $x_{jf}(t)$ used in the formulation. The optimal solution 320 includes regression models $B_j$ and trends $a_{jf}$ shown together as 330.

Optimal Estimation Formulation block 300 in FIG. 4 illustrates formation of Fleet Index L (2). Individual model fit error indexes $L_j$ in (3) for j=1 and j=n are shown as Index$_1$ 365 and Index$_n$ 385. Computing indexes 365 and 383 is based on $y_{jf}(t)$, $x_{jf}(t)$ shown for j=1 and j=n as Data$_1$ 350, Data$_2$ 370, the models $B_j$ shown as 362, 382, and trends $a_{jf}$ shown as 360, 380. Overall Loss Index L (2) is shown as Fleet Index 399 and includes indexes 365, 383 along with a Model Index. The Model Index described the deviation of models $B_1$ shown as Model$_1$ 362 and Model 382 from B* shown as Fleet Average Model 390.

In one or more embodiments, monitoring and reporting of anomalies rely on the knowledge that the majority of the assets in the fleet and data sets for each asset are nominal. A small percentage of the assets and/or the data sets might be abnormal and need to be reported as such. The innovation presents an automated system that processes the data without a human intervention and provides reports anomaly reports in the end. These reports provide decision support and can be reviewed or acted upon by a human operator.

In one or more embodiments, minimizing index (2) yields estimates of the regression models $B_j$, and trends $a_{jf}$ for all assets in the fleet shown as Models & Trends 320. The estimates and the asset data $y_{jf}$ allow computing model fit residuals $r_{jf}(t) = y_{jf}(t) - B_j x_{jf}(t) - a_{jf}$. The estimates and the residuals are used in Monitoring function 340 to provide Anomaly detection, Diagnostics, and Predictive trending (prognostics). A variety of approaches to anomaly detection, diagnostics, and prognostics cab be used in conjunction with the claimed invention. One example is described below.

In one or more embodiments, anomaly detection in aircraft fleet data can be performed by computing Hotelling T2 statistics for the filtered trends $a_{jf}$ for all aircraft to monitor the drift. The abrupt change can be detected by mentoring T2 for regression model residuals $r_{jf}$.

In one or more embodiments, diagnostics of an output fault with signature f can be performed by monitoring a contribution reconstruction index obtained by projecting the drift $a_{jf}$ or residuals error $r_{jf}$ onto the fault signature direction f in the metrics defined by the empirical noise covariance. For an input fault with signature g, the contribution reconstruction index is obtained by projecting $r_{jf}$ onto $B_j g$.

In one or more embodiments, predictive trending for the fleet can be performed by applying modern forecasting methods to the time series $a_{j1}, \ldots, a_{jF}$ that express the trends.

In one or more embodiments, the analytical approach is based on performing the fleet monitoring by using decision variables (regression model fit solution) obtained by minimizing a quadratic loss index for the fleet data. The discussion implied that the same regressors are used for all channels. The alternative embodiments include, without limitation:

1. Using different regressors for different channels, which is equivalent on constraining the regression coefficients (decision variables) to have a fixed sparsity pattern. The regressor choice and the sparsity pattern could be determined from first principle physics modeling, from experience, from exploratory data mining, by using machine learning methods, or in some other way.

2. Formulating a non-quadratic data fit problem, such as one of the machine learning data modeling problems.

3. Using an iterative distributed solver for the non-quadratic problem.

4. Including fault isolation computations where alternative fault hypothesis are evaluated in the monitoring function to produce a short list of specific fault conditions likely to be present for each anomaly found.

5. Performing incremental processing of the data to provide an efficient solution for the incrementally extended fleet data set. Such solution would involve using the interim computation results for earlier processed fleet data.

Aircraft Fleet Monitoring Example

Figure 5:
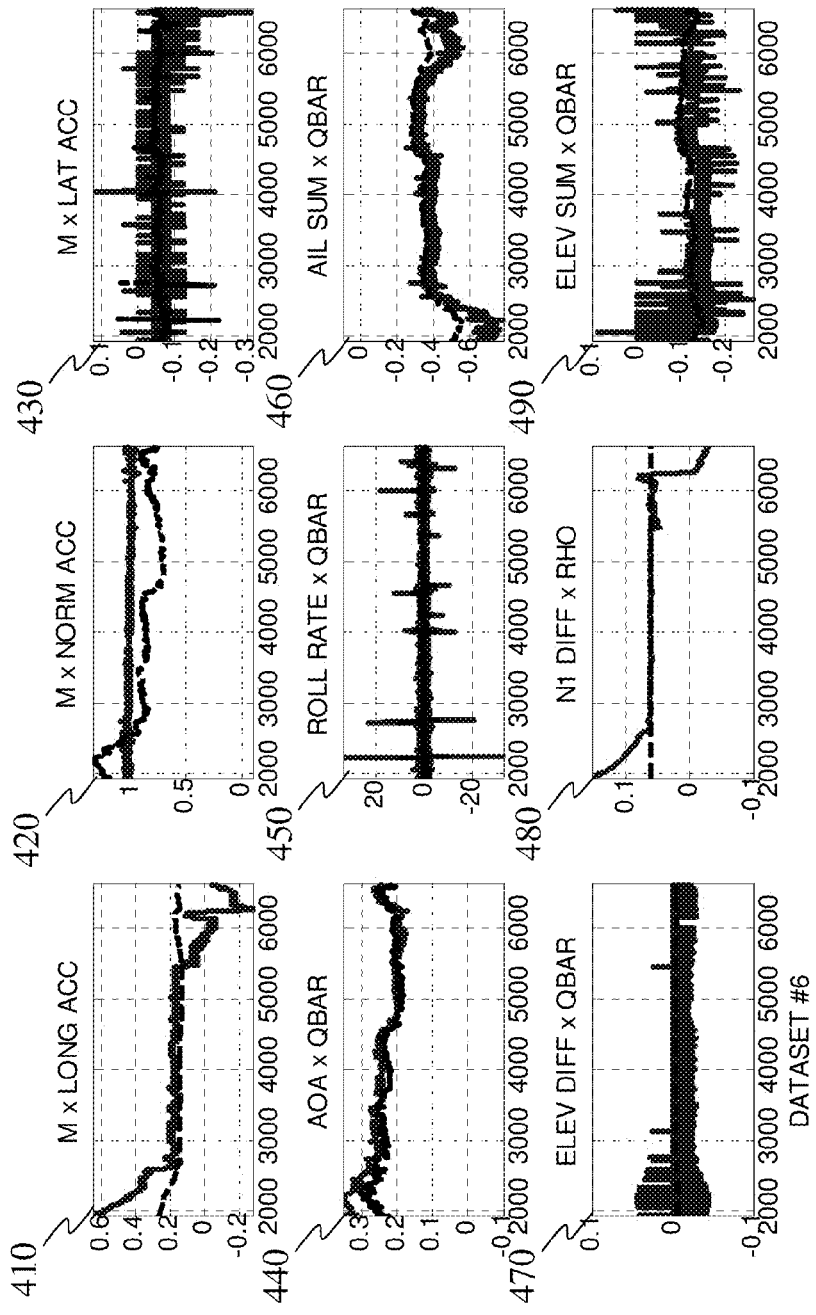
FIG. 5 is a chart which shows exemplary time history plots for FOQA data for A319 aircraft and the regression model fit for this data.

In one or more embodiments, the raw data are the Flight Operations Quality Assurance (FOQA) data collected from aircraft. In this example, the FOQA data is used to characterize flight dynamics of aircraft in a near-steady flight around the cruise regime. In this example, one data record includes all the data collected in one flight of a given aircraft. An example of regression data fit for FOQA data for A319 aircraft is shown in FIG. 5. The labels show the response variables $y_k$. The solid lines show $y_k(t)$ plots, the dashed lines show the regression model fit.

In one or more embodiments, the airframe performance is modeled as linear regression as described above. The exemplary embodiment uses the following regressors x (explanatory variables) that are computed based on the fan rotation speeds for the left (L) and right (R) engines $N_{1,L}, N_{1,R}$, the air density $\rho_{air}$, the aircraft mass m, the aircraft roll $a_{roll}$ acceleration, the dynamic pressure q, the angle of attack (AOA) $\alpha$, and control surface deflections $u_{elev,L}, u_{elev,R}, u_{stab}, u_{rudder}$.

FIG. 5 shows the regression model fit obtained using the described regressors x for the following response variables y M x LONG ACC 410 corresponds to $ma_{long}$
M x NORM ACC 420 corresponds to $ma_{norm}$
M x LAT ACC 430 corresponds to $ma_{lat}$
AOA x QBAR 440 corresponds to $q\alpha$
ROLL RATE x QBAR 450 corresponds to $qr_{roll}$
AIL SUM x QBAR 460 corresponds to $q(u_{aileron,L} + u_{aileron,R})$
ELEV DIFF x QBAR 470 corresponds to $q(u_{elev,L} - u_{elev,R})$
N1 DIFF x RHO 480 corresponds to $(N_{1,L} - N_{1,R})\rho_{air}$
ELEV SUM x QBAR 490 corresponds to $q(u_{elev,L} + u_{elev,R})$ where $a_{long}, a_{lat}, a_{norm}$ are the longitudinal, lateral, and normal accelerations of the aircraft center of gravity (CG), $r_{roll}$ is the roll rate, $u_{aileron,L}$ and $u_{aileron,R}$ are control surface deflections. Other variables are as defined above for regressors x. The solid lines in the FIG. 5 plots show the actual aircraft data and the dashed lines show the regression fit.

This example uses a 3-level regression model for a fleet of aircraft where t is a sample number inside a FOQA flight data set (data record)

j is an aircraft tail number f is a consecutive flight number for a given tail

In one or more embodiments, the 3-level linear regression model for longitudinal (time dependent) data with fixed effects is described by (1). The regression fit problem is to minimize the loss index L (2)-(4) over $a_{jf}$, $B_j$, and B. Using the representation (5) for indexes $M_{jf}$ in (4), the solution of the optimal estimation problem for the regression parameters now looks as follows: first compute the covariance matrices $\{Q_{jf}\}$ for all data records for all assets, then minimize the loss index L with respect to $\{B^*\}, \{B_j\}, \{a_{jf}\}$.

Figure 6:
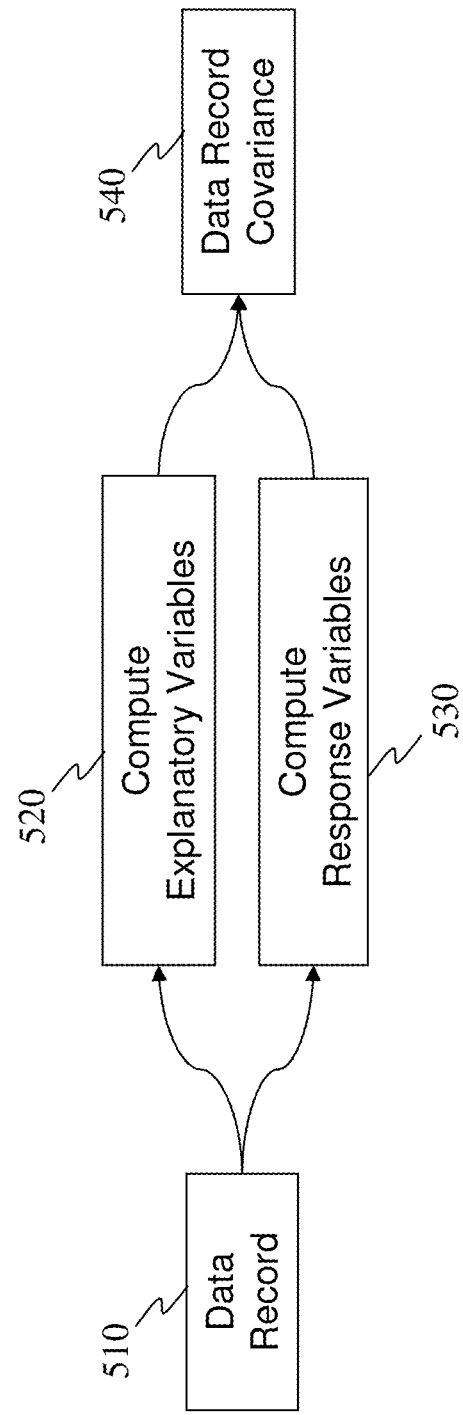
FIG. 6 is a block diagram that illustrates computation of covariance matrices for flight record in the Preprocessing step.

FIG. 6 illustrates computation of covariance matrices $\{Q_{jf}\}$ in accordance to (6) for flight record (the Preprocessing step). Data Record 510 (FOQA dataset for the fight) is used to compute the nonlinear regressors $x_{jf}(t)$ through the flight, this is shown as Compute Explanatory Variables 520. The same data are used to compute the dependent variables $y_{jf}(t)$ through the flight, this is shown as Compute Response Variables 520. The multivariable time series $x_{jf}(t)$ and $y_{jf}(t)$ are then combined to compute $Q_{jf}$, Data Record Covariance 540, in accordance with (6) (as mentioned above, it can be assumed that $z_{jf}(t)=1$. The preprocessing is done for one Data Record at a time. In accordance with the claimed invention it is carried in the Local CEs in a distributed manner. The preprocessing can be also parallelized within each CE.

Figure 7:
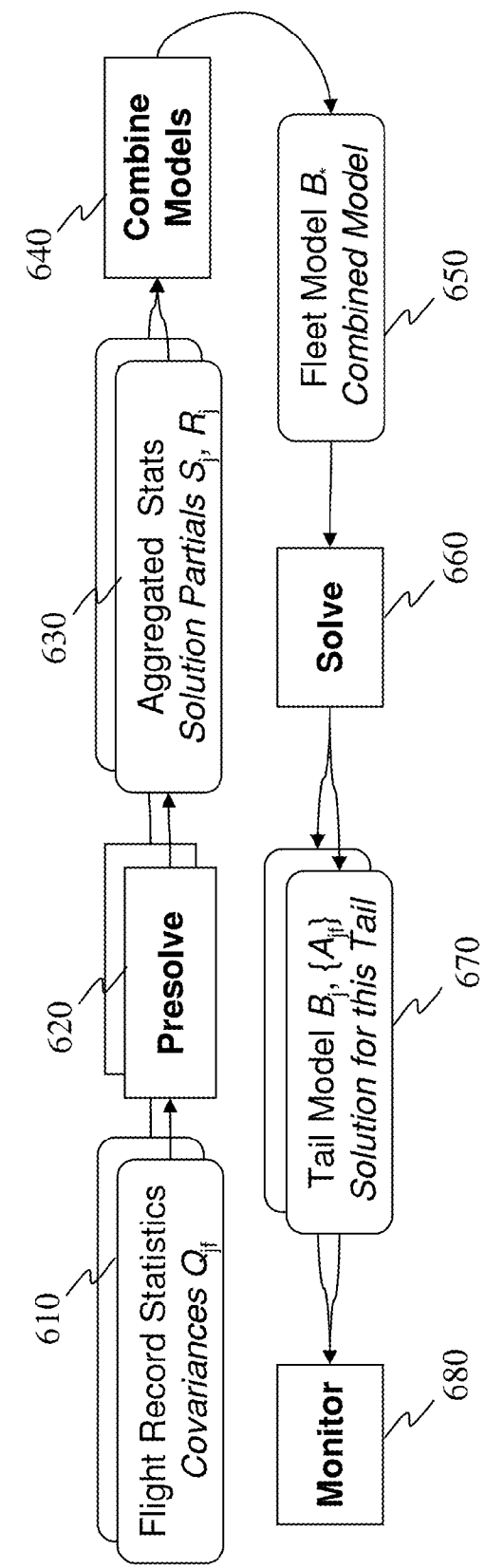
FIG. 7 is a block diagram that illustrates post-processing computations of the estimate for the fleet average regression model B*, personalized regression models for each aircraft tail $\{B_j\}$, and the collection of biases (drift) time series $\{a_{jf}\}$ for each aircraft tail.

FIG. 7 illustrates the post-processing computations that compute the estimate for the fleet average regression model B*, personalized regression models for each aircraft tail $\{B_j\}$, and the collection of biases (drift) time series $\{a_{jf}\}$ for each aircraft tail by efficiently minimizing loss index L (2)-(4). The estimates use the covariance matrices $Q_{jf}$ shown as 610 for all flight records. The loss index has form (2), where $L_j$ (3), (4) are quadratic forms in $B_j, a_{j1}, \ldots, a_{jN}$. Assuming that B* is known, the result of minimization of $L_j$ with respect to the tail data $B_j, a_{j1}, \ldots, a_{jN}$ can be written in the form $$B_j = S_j B^* + R_j, \quad (7)$$

where the solution partials matrices $S_j, R_j$ can be computed from the data for tail j only. The partials $S_j, R_j$ are shown as 630. Computing these matrices is shown as Presolve 620. The presolve computations for different tails are independent and can be carried in parallel. Substituting the solutions (7) into loss index L (2) allows to compute the optimal solution for average model 8 through the partials $S_j$ and $R_j$. This computation is shown as Combine Models 640; it produces Fleet Model B* 650. With B* known, Solve 660 computes the solution for a given tail j as the minimum of $L_j$ with respect to the tail data expression using (7) for $B_j$ and accompanying expressions for the trend $a_{j1}, \ldots, a_{jN}$. The above described solution to the problem of minimizing the quadratic loss index L (2) is a batch computation solution; the same result can be also computed recursively as clear to somebody skilled in the art. The recursive computations can use a version of the well-known Recursive Least Squares method, a Kalman Filter method, an Information Filter Method, or other similar representation of a recursive solution of the quadratic optimization problem (2). By using the recursive formulation, the coordinated data processing can be performed incrementally, by adding new data chunks and updating the intermediate state data of the recursive computations, such as the Kalman Filter states, to reflect all data processed so far. In the incremental data processing, the processing results, such as the monitoring results described below, are computed based on the intermediate processing state data, such as the Kalman Filter states.

In one or more embodiments, monitoring function 680 uses the computed models and trends $\{B^*, \{B_j\}, \{a_{jf}\}\}$ as an input to find anomalies of the M-type, T-type, and I-type Model (M-type) Anomalies are monitored by applying MSPC to the set of the model matrices $B_j$. MSPC looks for the anomalies in the cross-fleet data by computing Hotelling T2 statistics for each vector. The models $B_j$ outside of the scaled empirical covariance ellipsoid are marked and reported as anomalies.

Trend (T-type) Anomalies are monitored by applying MSPC to the estimated trends $A_{jf}$. The trend covariance is computed across all tails and the outliers detected using a modified Hotelling T2 statistics.

Instance (I-type) Anomalies are monitored similar in spirit to how the trends are monitored. The empirical covariances are computed by summation at three levels: all time samples for all flights for all tails. Such monitoring can be performed using the preprocessed covariance without the need to work with the raw data records.

Figure 8:
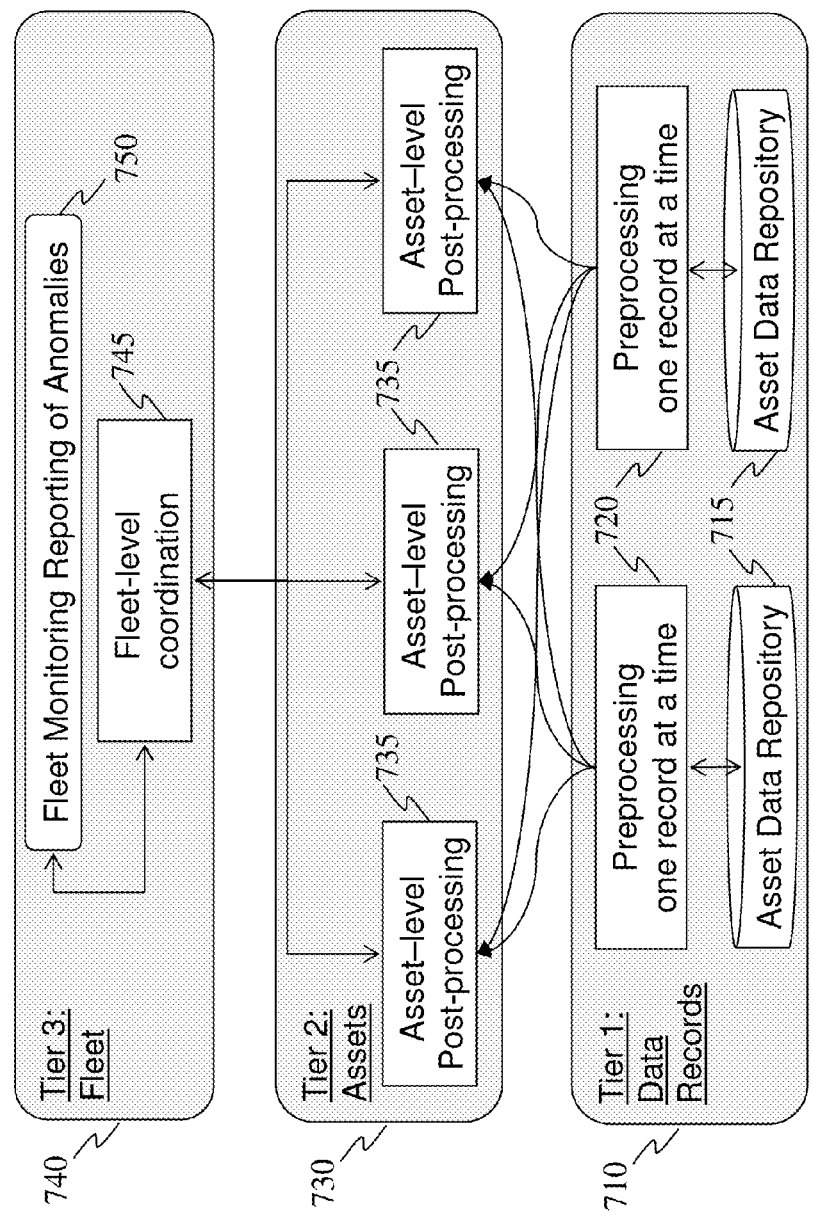
FIG. 8 is a block diagram that illustrates the overall system implementation for the aircraft FOQA data monitoring example.

The exemplary overall system implementation for the described example of FOQA data monitoring is illustrated in FIG. 8. Overall data processing is decomposed into Tier 1, Tier 2, and Tier 3 functions.

In one or more embodiments, tier 1 Data Records 710 is implemented on the Local CEs and deals with raw FOQA data in the distributed Asset Data Repositories 715. Preprocessing one record at a time 720 is amenable to embarrassingly parallel implementation. Distributed processing of local data using networked remote computers can be described as grid computing.

In this example, Data Records 710 are FOQA flight data sets that contain 300 channels sampled at 1 Hz for a few hours of one flight. Each record takes on the order of 100 Mb of disk space. The entire fleet data set has 100,000 flight records and takes 10 Tb.

Tier 1 Pre-processing agent processes one flight record at a time and computes the covariance matrix Q. One example implementation involved 20 regressors, so covariance matrix 20×20 takes about 1 Kb. This provides a 10,000:1 data reduction. Another example implementation involved smaller flight records with 50 channels sampled at 4000 instances each. This provides data reduction in excess of 1,000:1.

The architecture allows for other types of Tier 1 pre-processing as long as (i) they provide substantial data reduction (ii) by using the preprocessed data it is possible to obtain the result as accurate as by processing the raw data in a centralized way.

The processing of FOQA data for an aircraft fleet with 100,000 flights for hundreds of aircraft can be completed in less than an hour on a few distributed computers.

In one or more embodiments, Tier 2 Assets 730 and Tier 3 Fleet 740 are implemented on a Central CE, which might be a multiprocessor computer system.

Tier 2 receives the preprocessing results from Tier 1 distributed computers and aggregates them by the tail number (the asset number in the fleet). With the 1:1000 data reduction, the fleet data takes the total of 10 Gb. This is little enough to be processed on a single computer.

Asset-level processing 735 in Tier 2 collects and processes the data for all flights of the same tail. For a fleet of 1000 aircraft this makes 10 Mb per asset, which easily fits into the memory for the processing. The asset-level processing is done separately and independently for each tail. This processing can be done in parallel on the multiple processors of Tier 2 CE or sequentially or both.

Tier 3 Fleet-level coordination 745 gathers Tier 2 Asset-level results and scatters coordinated Tier 2 updates. The fleet-level data at Tier 3 is on the order of 100 Kb in size.

Tier 3 also implements Fleet Monitoring Report of Anomalies 750.

The described exemplary grid computing framework for data mining and monitoring could be scaled further to Petabyte scale. For such scale, each Tier 1 CE would resemble a cluster with parallel execution of the preprocessing. Tier 2 would resemble a cluster processing of under 1 Tb of data. Tier 3 would be used to coordinate Tier 2 processors in the cluster.

Alternate Embodiments

In one or more embodiments described above, the fleet of apparatuses or assets being monitored is the fleet of the aircraft and the data collected from the aircraft data recorder are FOQA (Flight Operation Quality Assurance) data. The alternative embodiments include, without limitation:

1. Monitoring a fleet of aircraft engines by collecting the engine flight (mission) data from the engine avionics.

2. Monitoring a fleet of ground vehicles, such as trucks, buses, or cars by collecting the fleet data 3. Monitoring a fleet of semiconductor manufacturing tools deployed at different fabrication plants (fabs). A semiconductor manufacturing tool is an apparatus for implementing a stage of the semiconductor device manufacturing.

4. Monitoring electric power generation equipment such as a fleet of power turbines or a fleet of wind power generators.

5. Monitoring electrical grid equipment such as a fleet of transformers.

Each of the alternative embodiments would use a different set of the regressors at the data preprocessing step. The overall system design and method for DFM are as described in this disclosure.

Exemplary Computer Platform

Figure 9:
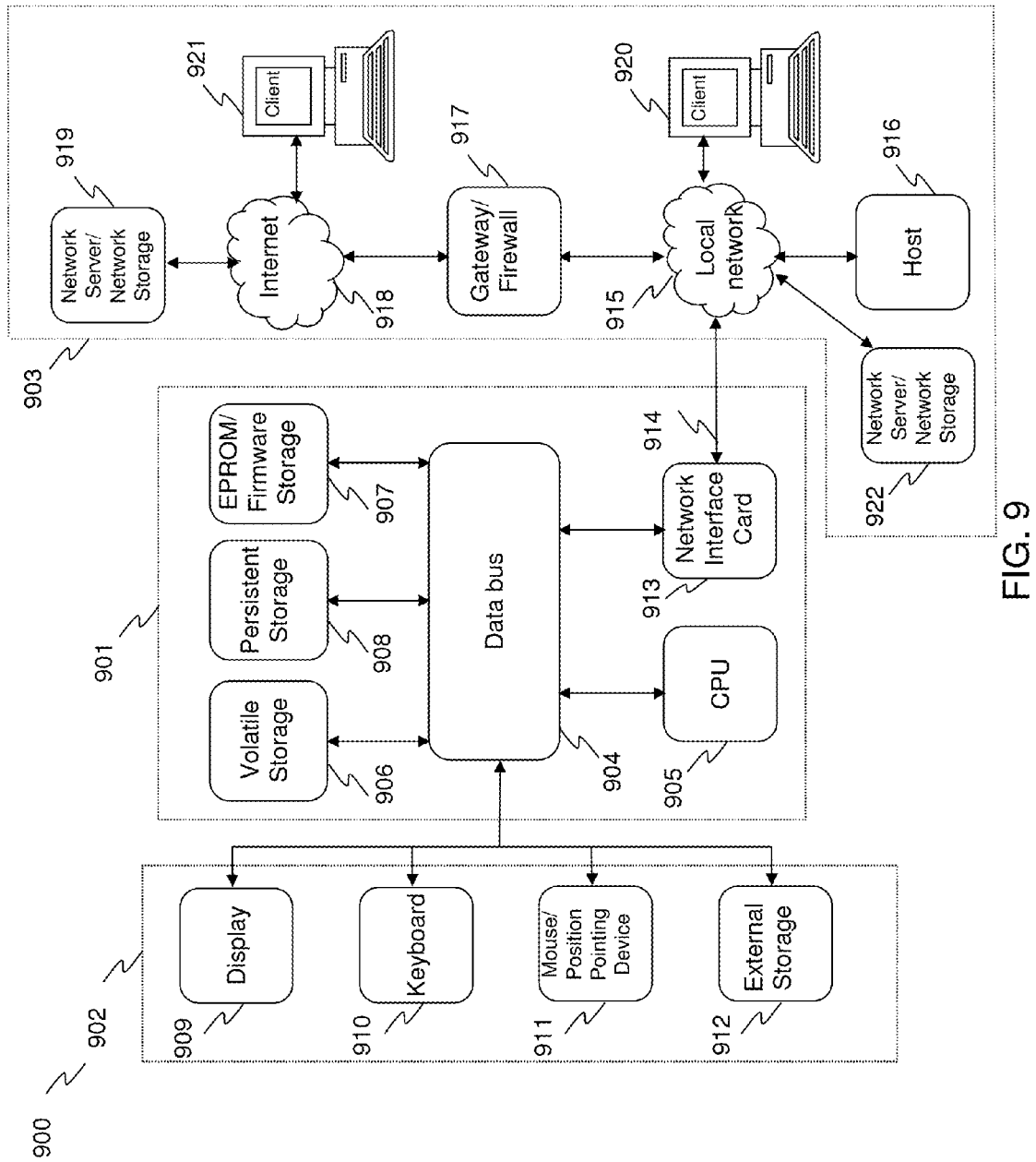
FIG. 9 is a block diagram that illustrates an embodiment of a computer/server system upon which an embodiment of the inventive methodology may be implemented.

FIG. 9 is a block diagram that illustrates an embodiment of a computer/server system 900 upon which an embodiment of the inventive methodology may be implemented. The system 900 includes a computer/server platform 901, peripheral devices 902 and network resources 903. Peripheral devices 902 may be absent if computer system 900 is implemented as an embedded system, e.g., as an embedded control and monitoring system which is integrated with the apparatus.

The computer platform 901 may include a data bus 904 or other communication mechanism for communicating information across and among various parts of the computer platform 901, and a processor 905 coupled with bus 901 for processing information and performing other computational and control tasks. Computer platform 901 also includes a volatile storage 906, such as a random access memory (RAM) or other dynamic storage device, coupled to bus 904 for storing various information as well as instructions to be executed by processor 905. The volatile storage 906 also may be used for storing temporary variables or other intermediate information during execution of instructions by processor 905. Computer platform 901 may further include a read only memory (ROM or EPROM) 907 or other static storage device coupled to bus 904 for storing static information and instructions for processor 905, such as basic input-output system (BIOS), as well as various system configuration parameters. A persistent storage device 908, such as a magnetic disk, optical disk, or solid-state flash memory device is provided and coupled to bus 901 for storing information and instructions.

Computer platform 901 may be coupled via bus 904 to a display 909, such as a cathode ray tube (CRT), plasma display, or a liquid crystal display (LCD), for displaying information to a system administrator or user of the computer platform 901. An input device 910, including alphanumeric and other keys, is coupled to bus 901 for communicating information and command selections to processor 905. Another type of user input device is cursor control device 911, such as a mouse, a trackball, or cursor direction keys for communicating direction information and command selections to processor 904 and for controlling cursor movement on display 909. This input device typically has two degrees of freedom in two axes, a first axis (e.g., x) and a second axis (e.g., y), that allows the device to specify positions in a plane.

An external storage device 912 may be connected to the computer platform 901 via bus 904 to provide an extra or removable storage capacity for the computer platform 901. In an embodiment of the computer system 900, the external removable storage device 912 may be used to facilitate exchange of data with other computer systems.

The invention is related to the use of computer system 900 for implementing the techniques described herein. In an embodiment, the inventive system may reside on one or multiple machines such as computer platform 901. According to one embodiment of the invention, the techniques described herein are performed by computer system 900 in response to processor 905 executing one or more sequences of one or more instructions contained in the volatile memory 906. Such instructions may be read into volatile memory 906 from another computer-readable medium, such as persistent storage device 908. Execution of the sequences of instructions contained in the volatile memory 906 causes processor 905 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 905 for execution. The computer-readable medium is just one example of a machine-readable medium, which may carry instructions for implementing any of the methods and/or techniques described herein. Such a medium may take many forms, including but not limited to, non-volatile media or volatile media. Non-volatile media includes, for example, optical or magnetic disks, such as storage device 908. Volatile media includes dynamic memory, such as volatile storage 906.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 905 for execution. For example, the instructions may initially be carried on a magnetic disk from a remote computer. Alternatively, a remote computer can load the instructions into its dynamic memory and use an infra-red transmitter to convert the data to an infra-red signal. An infra-red detector local to computer system 900 can receive the data carried in the infra-red signal and appropriate circuitry can place the data on the data bus 904. The bus 904 carries the data to the volatile storage 906, from which processor 905 retrieves and executes the instructions. The instructions received by the volatile memory 906 may optionally be stored on persistent storage device 908 either before or after execution by processor 905. The instructions may also be downloaded into the computer platform 901 via Internet using a variety of network data communication protocols well known in the art.

The computer platform 901 also includes a communication interface, such as network interface card 913 coupled to the data bus 904. Communication interface 913 provides a two-way data communication coupling to a network link 914 that is connected to a local network 915. For example, communication interface 913 may be an integrated services digital network (ISDN) card or a modem to provide a data communication connection to a corresponding type of telephone line. As another example, communication interface 913 may be a local area network interface card (LAN NIC) to provide a data communication connection to a compatible LAN. Wireless links, such as well-known 802.11a, 802.11b, 802.11g, 802.11n, 802.11ac, and Bluetooth may also used for network implementation. In embedded avionics implementations of the network, one of the standard backplane data buses such as, ARINC 629 or an optical avionics data bus may be used. A TTP data bus may also be used, such as in automotive and aerospace applications. In any such implementation, communication interface 913 sends and receives electrical, electromagnetic or optical signals that carry digital data streams representing various types of information.

Network link 913 typically provides data communication through one or more networks to other network resources. For example, network link 914 may provide a connection through local network 915 to a host computer 916, or a network storage/server 917. Additionally or alternatively, the network link 913 may connect through gateway/firewall 917 to the wide-area or global network 918, such as an Internet. Thus, the computer platform 901 can access network resources located anywhere on the Internet 918, such as a remote network storage/server 919. On the other hand, the computer platform 901 may also be accessed by clients located anywhere on the local network 915 and/or the Internet 918. The network clients 920 and 921 may themselves be implemented based on the computer platform similar to the platform 901.

Local network 915 and the Internet 918 both use electrical, electromagnetic or optical signals that carry digital data streams. The signals through the various networks and the signals on network link 914 and through communication interface 913, which carry the digital data to and from computer platform 901, are exemplary forms of carrier waves transporting the information.

Computer platform 901 can send messages and receive data, including program code, through the variety of network(s) including Internet 918 and local network 915, network link 914 and communication interface 913. In the Internet example, when the system 901 acts as a network server, it might transmit a requested code or data for an application program running on client(s) 920 and/or 921 through Internet 918, gateway/firewall 917, local network 915 and communication interface 913. Similarly, it may receive code from other network resources.

The received code may be executed by processor 905 as it is received, and/or stored in persistent or volatile storage devices 908 and 906, respectively, or other non-volatile storage for later execution. In this manner, computer system 901 may obtain application code in the form of a carrier wave.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, VHDL, C/C++, Matlab/Simulink, Labview, python, perl, Java, ruby, shell scripts, etc.

Moreover, other implementations of the invention will be apparent to those skilled in the art from consideration of the specification and practice of the invention disclosed herein. Various aspects and/or components of the described embodiments may be used singly or in any combination in the inventive diagnostic and monitoring system. It is intended that the specification and examples be considered as exemplary only, with a true scope and spirit of the invention being indicated by the following claims.

What is claimed is:

1. A system for monitoring a plurality of assets, the assets comprising engineered systems or machines of the same type, the system comprising: at least one Local Computing Elements and a Central Computing Element, wherein:
   a. each of the plurality of assets generating asset data for monitoring of the asset condition or performance;
   b. each of the at least one Local Computing Elements, comprising a processor, is connected to a Local Data Repository receiving and storing the asset data as individual data records, wherein each of the individual data records comprises a plurality of data channels from a corresponding asset of the plurality of assets of the same type collected over a predetermined period of time;
   c. each of the at least one Local Computing Elements is connected to the Central Computing Element through a data link;
   d. each of the at least one Local Computing Elements pre-processes the individual data records in the Local Data Repository to produce compressed data, wherein the pre-processing of the monitoring data generated by each asset comprises computing time series of regression variable vectors, each regression variable vector comprising one or more dependent variables and one or more regressors variables, wherein the data record pre-processing comprises calculating an empirical covariance matrix for the regression variable vector from the data record and the compressed data include the empirical covariance matrixes, the compressed data being transmitted over the data link to the Central Computing Element;
   e. each of the individual data records being pre-processed separately and independently to produce the compressed data;
   f. the Central Computing Element collects, stores, and post-processes the compressed data from all Local Computing Elements to obtain monitoring reporting data, the monitoring reporting data being displayed or transmitted by the Central Computing Element as the monitoring system output; and
   g. the monitoring reporting data is computed based on a result of an optimal estimation of the model parameters for the plurality of the assets, the model parameters comprising model parameters for each of the assets, the model parameters and the monitoring reporting data computed by the Central Computing Element using compressed data from all the Local Computing Elements being the same as if all the asset monitoring data were simultaneously available and used for the optimal estimation of the model parameters.

2. The system according to claim 1, wherein the regression fit of the asset monitoring data is based on a multi-level regression model with fixed effects describing asset-to-asset variability and data record-to-data record trends.

3. The system according to claim 1, wherein the empirical covariance matrix comprises a sample second moment matrix for the combined regressors and performance variables.

4. The system according to claim 1, wherein the coordinated data processing is performed incrementally, by updating intermediate processing state data and wherein the monitoring reporting data are computed based on the intermediate processing state data.

5. The system according to claim 1, wherein the assets comprise at least one of: manufacturing tools, machines, power systems, propulsion systems, ground vehicles, aircraft, marine vehicles, weapon systems, structural assets, building assets, production and service plant assets, assets in power, water and waste treatment facilities, distribution network assets, communication network assets, IT system assets and transport system assets.

6. The system according to claim 1, wherein the monitoring reporting data computed by the Central Computing Element comprise the results of at least one of: anomaly detection, fault isolation, and trend forecasting for the plurality of the monitored assets.

7. A method for monitoring a plurality of assets, the assets comprising engineered systems or machines of the same type, the method being performed in a system comprising at least one Local Computing Elements and a Central Computing Element, the method comprising:
   a. generating, by each of the plurality of assets, asset data for monitoring of the asset condition or performance;
   b. receiving and storing the asset data by a Local Data Repository as individual data records, wherein each of the individual data records comprises a plurality of data channels from a corresponding asset of the plurality of assets of the same type collected over a predetermined period of time, wherein each of the at least one Local Computing Elements is connected to the Local Data Repository and wherein each of the at least one Local Computing Elements is connected to the Central Computing Element through a data link;
   c. pre-processing by each of the at least one Local Computing Elements the individual data records in the Local Data Repository to produce compressed data, wherein the pre-processing of the monitoring data generated by each asset comprises computing time series of regression variable vectors, each regression variable vector comprising one or more dependent variables and one or more regressors variables, wherein the data record pre-processing comprises calculating an empirical covariance matrix for the regression variable vector from the data record and the compressed data include the empirical covariance matrixes, wherein each of the individual data records are being pre-processed separately and independently to produce the compressed data;

d. transmitting the compressed data over the data link to the Central Computing Element;

e. collecting, storing, and post-processing by the Central Computing Element the compressed data from all Local Computing Elements to obtain monitoring reporting data, the monitoring reporting data being displayed or transmitted by the Central Computing Element as the monitoring system output; and f. computing the monitoring reporting data based on a result of an optimal estimation of the model parameters for the plurality of the assets, the said model parameters comprising model parameters for each of the assets, the model parameters and the monitoring reporting data computed by the Central Computing Element using compressed data from all the Local Computing Elements being the same as if all the asset monitoring data were simultaneously available and used for the optimal estimation.

8. The method according to claim 7, wherein the regression fit of the asset monitoring data is based on a multi-level regression model with fixed effects describing asset-to-asset variability and data record-to-data record trends.

9. The method according to claim 7, wherein the empirical covariance matrix comprises a sample second moment matrix for the combined regressors and performance variables.

10. The method according to claim 7, wherein the coordinated data processing is performed incrementally, by updating intermediate processing state data and wherein the monitoring reporting data are computed based on the intermediate processing state data.

11. The method according to claim 7, wherein the assets comprise at least one of: manufacturing tools, machines, power systems, propulsion systems, ground vehicles, aircraft, marine vehicles, weapon systems, structural assets, building assets, production and service plant assets, assets in power, water and waste treatment facilities, distribution network assets, communication network assets, IT system assets and transport system assets.

12. The method according to claim 7, wherein the monitoring reporting data computed by the Central Computing Element comprise the results of at least one of: anomaly detection, fault isolation, and trend forecasting for the plurality of the monitored assets.

13. A non-transitory computer-readable medium embodying a set of instructions, which, when executed by one or more processors of a system comprising at least one Local Computing Elements and a Central Computing Element, cause the one or more processors to perform a method for monitoring a plurality of assets, the assets comprising engineered systems or machines of the same type, the method comprising:

a. generating, by each of the plurality of assets, asset data for monitoring of the asset condition or performance;

b. receiving and storing the asset data by a Local Data Repository as individual data records, wherein each of the individual data records comprises a plurality of data channels from a corresponding asset of the plurality of assets of the same type collected over a predetermined period of time, wherein each of the at least one Local Computing Elements is connected to the Local Data Repository and wherein each of the at least one Local Computing Elements is connected to the Central Computing Element through a data link;

c. pre-processing by each of the at least one Local Computing Elements the individual data records in the Local Data Repository to produce compressed data, wherein the pre-processing of the monitoring data generated by each asset comprises computing time series of regression variable vectors, each regression variable vector comprising one or more dependent variables and one or more regressors variables, wherein the data record pre-processing comprises calculating an empirical covariance matrix for the regression variable vector from the data record and the compressed data include the empirical covariance matrixes, wherein each of the individual data records are being pre-processed separately and independently to produce the compressed data;

d. transmitting the compressed data over the data link to the Central Computing Element;

e. collecting, storing, and post-processing by the Central Computing Element the compressed data from all Local Computing Elements to obtain monitoring reporting data, the monitoring reporting data being displayed or transmitted by the Central Computing Element as the monitoring system output; and f. computing the monitoring reporting data based on a result of an optimal estimation of the model parameters for the plurality of the assets, the said model parameters comprising model parameters for each of the assets, the model parameters and the monitoring reporting data computed by the Central Computing Element using compressed data from all the Local Computing Elements being the same as if all the asset monitoring data were simultaneously available and used for the optimal estimation.

14. The non-transitory computer-readable medium according to claim 13, wherein the regression fit of the asset monitoring data is based on a multi-level regression model with fixed effects describing asset-to-asset variability and data record-to-data record trends.

15. The non-transitory computer-readable medium according to claim 13, wherein the empirical covariance matrix comprises a sample second moment matrix for the combined regressors and performance variables.

16. The non-transitory computer-readable medium according to claim 13, wherein the coordinated data processing is performed incrementally, by updating intermediate processing state data and wherein the monitoring reporting data are computed based on the intermediate processing state data.

17. The non-transitory computer-readable medium according to claim 13, wherein the assets comprise at least one of: manufacturing tools, machines, power systems, propulsion systems, ground vehicles, aircraft, marine vehicles, weapon systems, structural assets, building assets, production and service plant assets, assets in power, water and waste treatment facilities, distribution network assets, communication network assets, IT system assets and transport system assets.

* * * * *